April 16, 1935.   W. FREEGARD   1,998,079
APPARATUS FOR PRODUCING MIX-TONE ROOFING
Original Filed Sept. 12, 1927   3 Sheets-Sheet 1
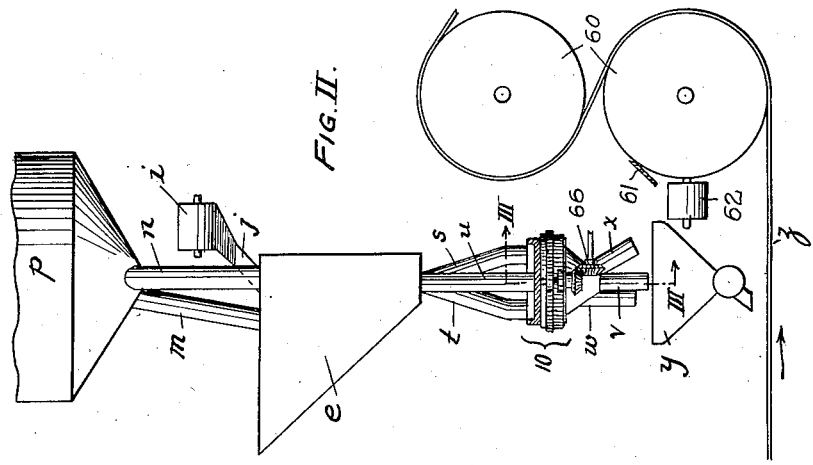
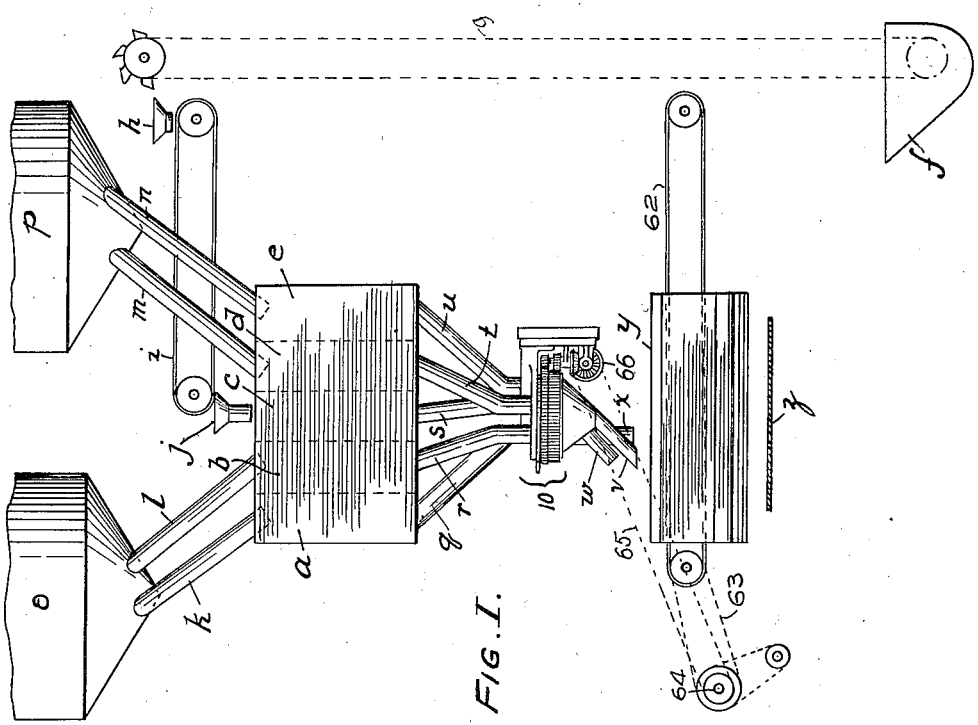
INVENTOR
William Freegaard
BY
ATTORNEYS.

April 16, 1935.  W. FREEGARD  1,998,079
APPARATUS FOR PRODUCING MIX-TONE ROOFING
Original Filed Sept. 12, 1927  3 Sheets-Sheet 2
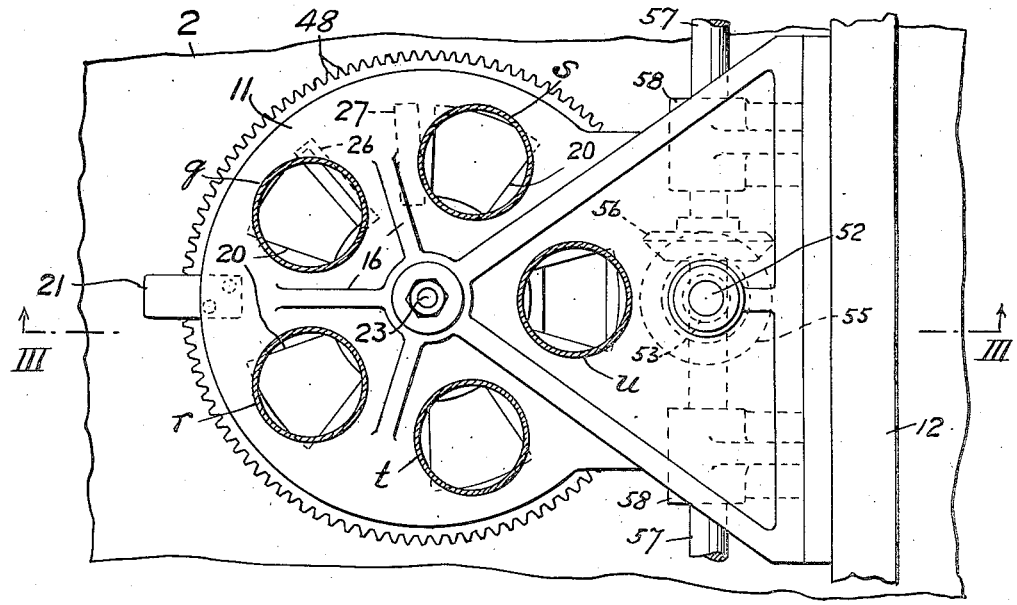
FIG. IV.
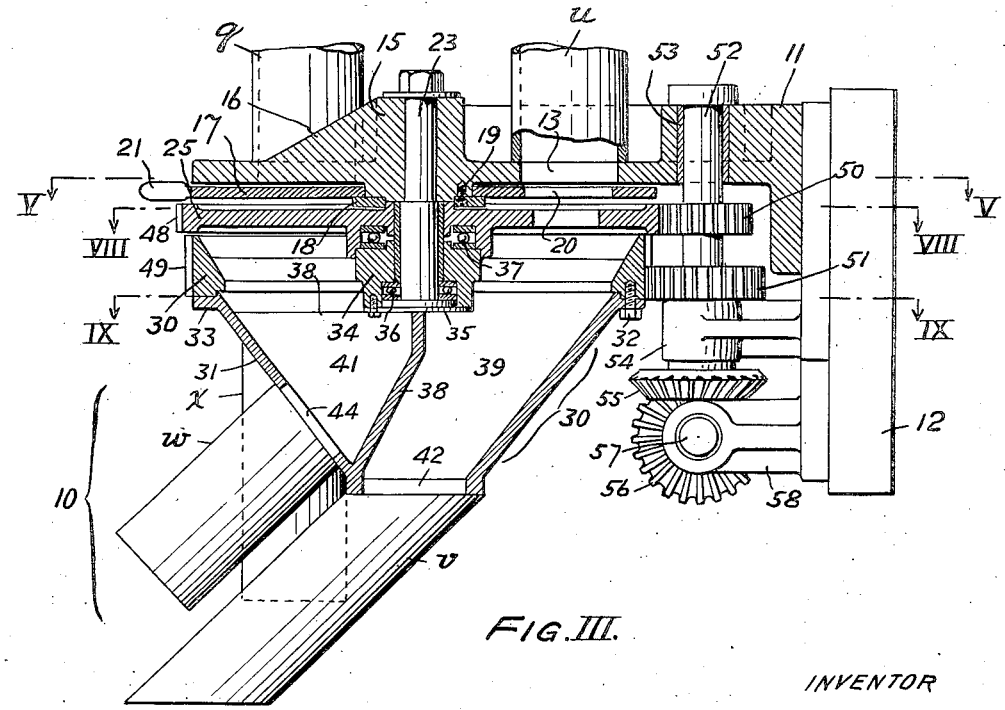
FIG. III.
INVENTOR
William Freegaard
BY
ATTORNEYS.
WITNESS:

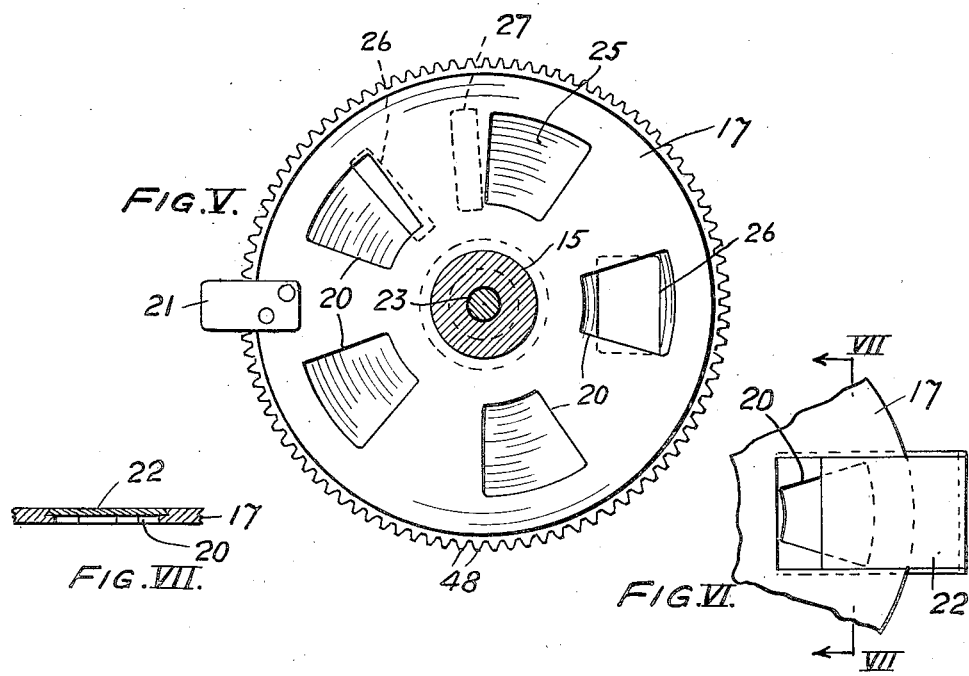
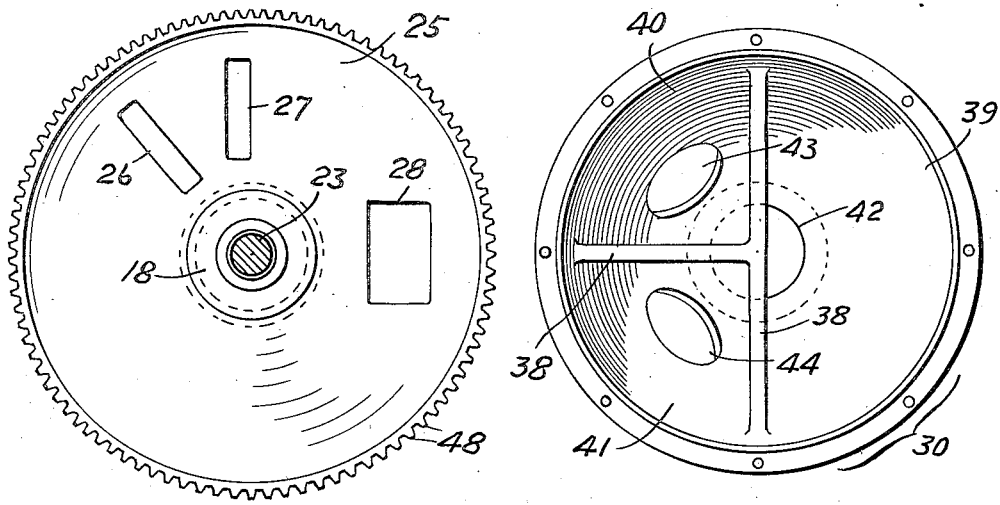

Patented Apr. 16, 1935

1,998,079

UNITED STATES PATENT OFFICE 1,998,079

APPARATUS FOR PRODUCING MIX-TONE ROOFING

William Freegard, Elizabeth, N. J., assignor to The Barber Asphalt Company, Philadelphia, Pa., a corporation of West Virginia Original application September 12, 1927, Serial No. 219,114. Divided and this application November 19, 1927, Serial No. 234,308

20 Claims. (Cl. 91—43)

This invention relates to the manufacture of "mix-tone" roofings by intermixture of contrasting materials in the roofing surface, and involves novel methods of mixing as well as novel apparatus. It is particularly adapted to prepared roofings of the grit-surfaced bituminous type.

For some time, pleasing color effects on roofs have been sought by combinations of grit-surfaced shingles or the like presenting a plurality of different colors. In order to avoid gaudiness, it is found necessary to go further than the mere employment of shingles of several colors: i. e. it is essential that (in general) each shingle present a plurality of colors, and that these colors blend into one another, even on the individual shingle. Mere uniform intermixture of colors in all shingles does not give sufficient variety of color: it is necessary that the mixture of colors vary over the roof. The only practical way of securing such results, heretofore, has been by making lots or "runs" of roofing with differently-proportioned mixtures of the colors employed, and mingling shingles cut from the different lots in each package. This, however, has required extra operations to mix the different lots of colored granules in the first instance, and to sort the different colored shingles into the packages afterward, as well as the complication of making roofing with various different mixtures.

In the manufacture of prepared roofing shingles according to my present invention, all such drawbacks and complications are avoided by supplying different colored granules to one "run" of roofing in a mixture of continually or frequently varying proportions. This is done automatically by my machine hereinafter described. In this way, a gradual blending of colors is produced on the roofing sheet, as well as a varying predominance of the different colors in different areas, and continuous streaks of any one color are avoided. And when shingles cut and packaged from the sheet in the usual manner are laid on the roof in the order in which they come from the package, the color effects obtained are fully equal to those by the prior methods above described, or even better. Moreover, my invention permits a progressive variation of the color effects in a series of substantially repetitive cycles of rather prolonged duration; so that a roof covered with the shingles will present a harmonious and more or less homogeneous or balanced appearance as a whole.

The granular material employed may be of any character desired, colored either naturally or artificially, and in the latter case either plain dipped or glazed with a vitrified glaze. Proper proportions of natural-colored slate granules also give very pleasing effects. In general, they should all be of approximately the same size and general type of fracture.

The roofing sheet may be made on an ordinary composite roofing machine, and may consist of a rag felt or burlap base suitably saturated and coated with bitumen.

In the drawings, Fig. I is a somewhat schematic elevation of roofing apparatus suitable for the purposes of my present invention.

Fig. II is a similar view at right angles to Fig. I, from the left of that figure.

Fig. III shows a vertical mid-sectional view through a portion of the apparatus, taken as indicated by the line III in Figs. II and IV.

Fig. IV shows a plan view of the apparatus shown in Fig. III.

Figs. V and VI are plan views of certain parts of the apparatus shown in Fig. III, Fig. V being taken as indicated by the line V—V, in Fig. III.

Fig. VII shows a vertical section taken as indicated by the line VII—VII in Fig. VI.

Fig. VIII is a fragmentary plan view of a part shown in Fig. III, taken as indicated by the line VIII—VIII in Fig. III.

Fig. IX shows a plan view of one of the parts, taken as indicated by the line IX—IX in Fig. III.

In the apparatus here shown, the variously colored surfacing granules are supplied to the mixer 10 from a series of small hoppers or bins $a, b, c, d, e$, directly over the mixer. As shown, the granules of one of the materials are raised from a receiving bin or hopper $f$ by a bucket-chain elevator $g$ which delivers them through a hopper $h$ to a belt conveyor $i$ that dumps them into the bin $c$ through a hopper $j$. Colored granules are supplied the bins $a, b, d, e$, through chutes $k, l, m, n$, from separate compartments in storage bins $o, p$. From the hoppers $a, b, c, d, e$, the granules are delivered to the mixer 10 through chutes $q, r, s, t, u$. From the mixer 10 the mixed granules are delivered through chutes $v, w, x$ to the trough or hopper of a commercial type of spreader $y$, which distributes the mixture uniformly over the still hot bituminated fabric $z$ travelling beneath the spreader. The sheet of bituminated fabric after passing beneath the spreader $y$ travels over rolls 60, usually provided in coating machines, and excess slate is removed from the sheet by means of a scraper 61 associated with the lower of the rolls 60. The excess slate falls on to an endless conveyor 62, actuated by a chain 63 in driving connection with a driven shaft 64 from which the mixer 10 is driven through the medium of a chain 65 and gearing 66. The conveyor 62 extends transversely with relation to the sheet and dumps the excess slate into hopper f from which it is transferred to bin c.

As shown in Figs. III and IV, the mixer 10 is supported by a horizontal bracket or top plate 11 projecting from a support 12. The chutes q, r, s, t, u, from the supply bins a, b, c, d, e, terminate in outlet openings 13 in the plate 11 these openings being circularly arranged and equally spaced. A central boss 15 on the plate 11 (suitably braced by integral radial webs 16) projects below the plate as well as above it, and affords external bearing for a regulating valve disk 17, located beneath the plate, and resting on a flat ring or flange member 18 secured to the boss by screws 19. As shown in Fig. V, the valve disk 17 has quadrangular or arcuate openings 20 corresponding to the outlet openings 13 in the plate 11, and the effective outlet openings for the different colored granules can be concurrently adjusted and regulated by turning the valve disk 17 one way or the other, by means of a handle 21. If desired, the outlet openings 13 may be regulated and varied individually, by means of radially movable shutter slides 22 set into the upper surface of the desk 17, and having their bevelled edges engaged in undercut rabbets on the disk.

Besides the regulation afforded by the valve disk 17 and its slides 22, the relative flow of material from the different outlets 13 is also continually controlled and varied by suitable means, such as a disk 25 rotatably mounted on a stud 23 in the boss 15 of the plate 11. As shown in Fig. VIII, this rotary flow control disk 25 has three openings 26, 27, 28, the last considerably larger than the others, and located about 90° from the nearer opening 27. As the disk 25 revolves, these openings 26, 27, 28 successively and periodically pass beneath each of the outlet openings 13, so that the different granules are periodically released or allowed to flow in quantities or charges corresponding to the sizes of the openings 26, 27, 28 and the length of time required for them to pass the stationary openings.

The varying charges or streams of granules flowing from the supply openings 13 under control of the disk 25 are received and collected by a conical hopper 30 mounted directly beneath the disk 25, and here shown as provided with a hub 34 through which extends the lower end of the stud 23. In the present instance, a ball bearing 36 is interposed between the hub 34 and a head 35 on the lower end of the stud 23, and a similar ball bearing 37 is interposed between the rotary flow control disk 25 and the upper side of the hub 34. Thus the disk 25 and the conical hopper 30 can rotate freely relative to one another, as well as relative to the stud 23 and the plate 11. As shown in Figs. III and IX, the conical hopper 30 is divided into a plurality of segmental compartments by diaphragm partitions 38, including a larger substantially semicircular compartment 39, and a couple of smaller substantially quadrant compartments 40, 41. The larger compartment 39 has an axial bottom outlet 42 to which is connected the chute or spout v while the compartments 40 and 41 have lateral outlets 43, 44 to which are connected the chutes or spouts w and x.

As shown in Figs. I, II and III, the upper rim 33 of the hopper 30 and the periphery of the flow control disk 25 have gear teeth that mesh with pinions 50 and 51 on an upright drive shaft 52 mounted in a bearing boss 53 on the plate 11 and in a bearing bracket 54 projecting from the support 12. As will be seen from the drawings, the peripheral gears on the disk 25 and the hopper rim 33 are of different diameters (the latter slightly smaller than the former) so that as the shaft 52 revolves, the disk and hopper will be driven at different speeds (the disk slightly slower than the hopper). As shown especially in Figs. III and IV, the shaft 52 may be driven from a horizontal shaft 57 mounted in bearing brackets 58 on the support 12, through bevelled gearings 55, 56.

In the operation of the apparatus, surfacing granules are fed by gravity from the bins a, b, c, d, e, to the supply openings 13. As each of the valve disc openings 26, 27, 28 passes beneath each of the openings 13, a charge or stream of the corresponding granules flows through the disc opening into the hopper compartments 39, 40 or 41 that happens to be beneath. The size (area) of this granule stream depends on the size of the disc opening; being largest for the large opening 28. At each revolution of the disc 25, therefore, three charges from each bin a, b, c, d, e, flow into the hopper 30. The duration and frequency of flow depend on the rate of revolution of the disc 25; for sufficiently rapid revolution of the disc, there is a practically continuous but varying stream of granules from each of the supply openings 13.

From these considerations alone, it will be apparent that the composition of the total flow of granules from the hopper 30 varies from time to time as the different sized disc openings 26, 27, 28 pass beneath the several supply openings 13.

If the compartmented hopper 30 should remain stationary, or be revolved at the same rate as the disc 25, its effect on the exact way in which the different granules are combined would be constant and of minor importance so far as the variations in granule stream composition and color effects on the roofing sheet are concerned. However, when this hopper 30 revolves at a different rate than the disc 25, it introduces additional variation, and much greater variety of granule stream composition and color effects become possible.

For with differential revolution of disc 25 and hopper 30, the identity of the openings 13 that deliver into any given hopper compartment during one complete revolution of the hopper will vary, as well as the identity and size of the disc openings 26, 27, 28 through which such delivery into a given hopper compartment takes place. Sometimes one or another disc opening 26, 27, or 28 will be located over one or another of the hopper septa 38 a greater or less angular distance in the travel of the hopper; sometimes three, two, one or none of the disc openings will continue over the large hopper compartment 39 a whole revolution or more; sometimes two, one, or none of the disc openings will remain over one or another of the smaller hopper compartments 40, 41 in similar way; and sometimes the number and size of the disc openings over a particular hopper compartment will change during a revolution of the hopper. And although the continually variant granule streams from all the several hopper compartments 39, 40, 41 are ultimately combined and intermixed in one and the same spreader y, yet the way in which the different granules are distributed amongst the hopper compartments and there intermixed effects the way in which they are ultimately combined and intermixed by the intermixture of the several granule streams from the hopper compartments. This effect is enhanced by the different arrangement of the several hopper spouts v, w, x, so that they deliver at different distances from the axis of revolution of the hopper 30 and from the center of the spreader hopper,—both longitudinally and crosswise of the latter.

Besides the variety and blending of granule colors produced by the mixer 10 as above indicated, there is a further blending due to the temporary accumulation of the mixed granules in a pile or "pool" in the mixer hopper. The larger the accumulated pool, the greater the blending, and vice-versa.

From the foregoing description, it will be apparent that the differential revolution of disc 25 and hopper 30 greatly increases the variety and blending of granule color effects, and may also greatly lengthen the period or cycle of variation. In general, the length of a cycle is proportional to the number of revolutions, made by the disc 25 and the hopper 30 between times when their angular relations to one another and to the stationary parts are exactly the same. While great variation in this respect is possible, I have obtained good results with a cycle corresponding to the passage of about seventy-five feet of roofing sheet z beneath the spreader y.

By angular adjustment of the regulating disc 17, the total rate of flow of the granules can be adapted to different linear speeds of the roofing sheet z without substantially effecting the variation in composition of the ultimate granule mixture. By adjustment of the various slides 22, the proportions of different granules can be varied and controlled according to the color effects desired. Other differences can, of course, be realized by putting the same granules in two or more of the supply bins a, b, c, d, e, or vice-versa.

I have not in this application claimed the method for producing mix-tone roofing herein disclosed, since such forms the subject matter of an application for patent filed by me September 12, 1927, Serial No. 219,114, of which this application is a division.

Having now fully described my invention, what I claim and desire to protect by Letters Patent is:—

1. Apparatus of the character described comprising means for supplying varying streams of contrasting granules for application to prepared roofing, and means for continuously variably combining and intermixing the streams on their way to the roofing.

2. Apparatus of the character described comprising means for intermixing supply streams of contrasting roofing surface granules in a plurality of combined streams of continually varying proportions, and means for mingling and temporarily accumulating the later streams in a pool on their way to the roofing.

3. Apparatus of the character described comprising sources of supply for contrasting roofing surface granules, means for advancing roofing, and relatively movable means defining outlet apertures of continually changing area, so as to vary the proportions in which the granules are delivered to the advancing roofing.

4. Apparatus of the character described comprising supply outlets for contrasting roofing granules, and differentially revolving flow-varying means and multiple collecting means therebeneath, for variably combining the granules.

5. Apparatus of the character described comprising supply outlets for contrasting roofing granules, differentially revolving flow-varying means and multiple collecting means therebeneath for variably combining the granules, and means for combining and temporarily accumulating the granules from said collecting means in a pool.

6. Apparatus of the character described comprising supply outlets for contrasting roofing granules, a revolving disk with apertures of different sizes for varying the relative flow through said outlets, and a differentially revolving compartmented receiver for variably combining the granules from said outlets.

7. Apparatus of the character described comprising supply sources for contrasting roofing surface granules, means for receiving and combining the granules from said sources, means for cyclically varying the flow of the different granules to said receiving means, and thus the proportion of the different granules in the combination, and means for regulating the flow of granules as a whole substantially without affecting the proportioning thereof as aforesaid.

8. Apparatus of the character described comprising supply outlets for contrasting roofing granules, with means for adjustably regulating the flow through them, a revolving disk with apertures of different sizes for varying the relative flow through said outlets, and a differentially revolving compartmented receiver for the granules from said outlets delivering from its several compartments at different distances from its axis of revolution.

9. Apparatus of the character described comprising chambers adapted to supply granules, said chambers supplying granules of different colors, means for forming temporary batches from granules supplied from the chambers, the batches being of different mixed compositions, and means for delivering streams from the respective batches, said streams having different locations.

10. Apparatus of the character described comprising chambers adapted to supply granules, said chambers supplying granules of different colors, means for forming temporary batches from granules supplied from the chambers, the batches being of different mixed compositions, and means for delivering streams from the respective batches, said streams having different varying locations.

11. Apparatus of the character described comprising chambers adapted to supply granules, said chambers supplying granules of different colors, means for forming temporary batches from granules supplied from the chambers, the batches being of different mixed compositions, and means for delivering streams from the respective batches, said streams having different continuously varying locations.

12. Apparatus of the character described comprising means for advancing a roofing strip, chambers adapted to supply granules of different colors, and means for variably combining granules supplied from the chambers and discharging streams of varying compositions, which streams have different locations.

13. Apparatus of the character described comprising means for advancing a roofing strip, chambers adapted to supply granules of different colors, and means for variably combining granules supplied from the chambers and discharging streams of varying compositions which streams have different locations, the streams being directed upon overlapping areas, whereby admixture of granules from the various streams takes place.

14. Apparatus of the character described comprising means for advancing a roofing strip, chambers adapted to supply granules of different colors, and means for variably combining granules supplied from the chambers and discharging streams of continuously varying compositions and having different locations.

15. Apparatus of the character described comprising means for advancing a roofing strip, chambers adapted to supply granules of different colors, and means for variably combining granules supplied from the chambers and discharging streams of continuously varying compositions and having different varying locations.

16. Apparatus of the character described comprising chambers adapted to supply granules of different colors, means for forming temporary batches of continuously varying compositions from granules supplied from the chambers, and means for delivering streams from the batches which streams have different locations.

17. Apparatus of the character described comprising chambers adapted to supply granules of different colors, means for forming temporary batches of continuously varying compositions from granules supplied from the chambers, and means for delivering streams from the batches which streams have different varying locations.

18. Apparatus of the character described comprising chambers adapted to supply granules of different colors, means for forming temporary batches of continuously varying compositions from granules supplied from the chambers, and means for delivering streams from the batches which streams have different varying locations, the streams being directed upon overlapping areas, whereby admixture of granules from the various streams takes place 19. Apparatus of the character described comprising means for advancing a roofing strip, chambers adapted to supply granules of different colors, and means for variably combining granules supplied from the chambers and discharging streams of varying compositions, said streams having locations varying transversely of the direction of motion of the roofing strip.

20. Apparatus of the character described comprising means for advancing a roofing strip, chambers adapted to supply granules of different colors, and means for variably combining granules supplied from the chambers and discharging streams of varying compositions, said streams having locations varying continuously transversely of the direction of motion of the roofing strip.

WILLIAM FREEGARD.